July 22, 1947.                    W. H. GABELER                    2,424,232
                            GEL MANUFACTURING APPARATUS
                               Filed Jan. 22, 1943
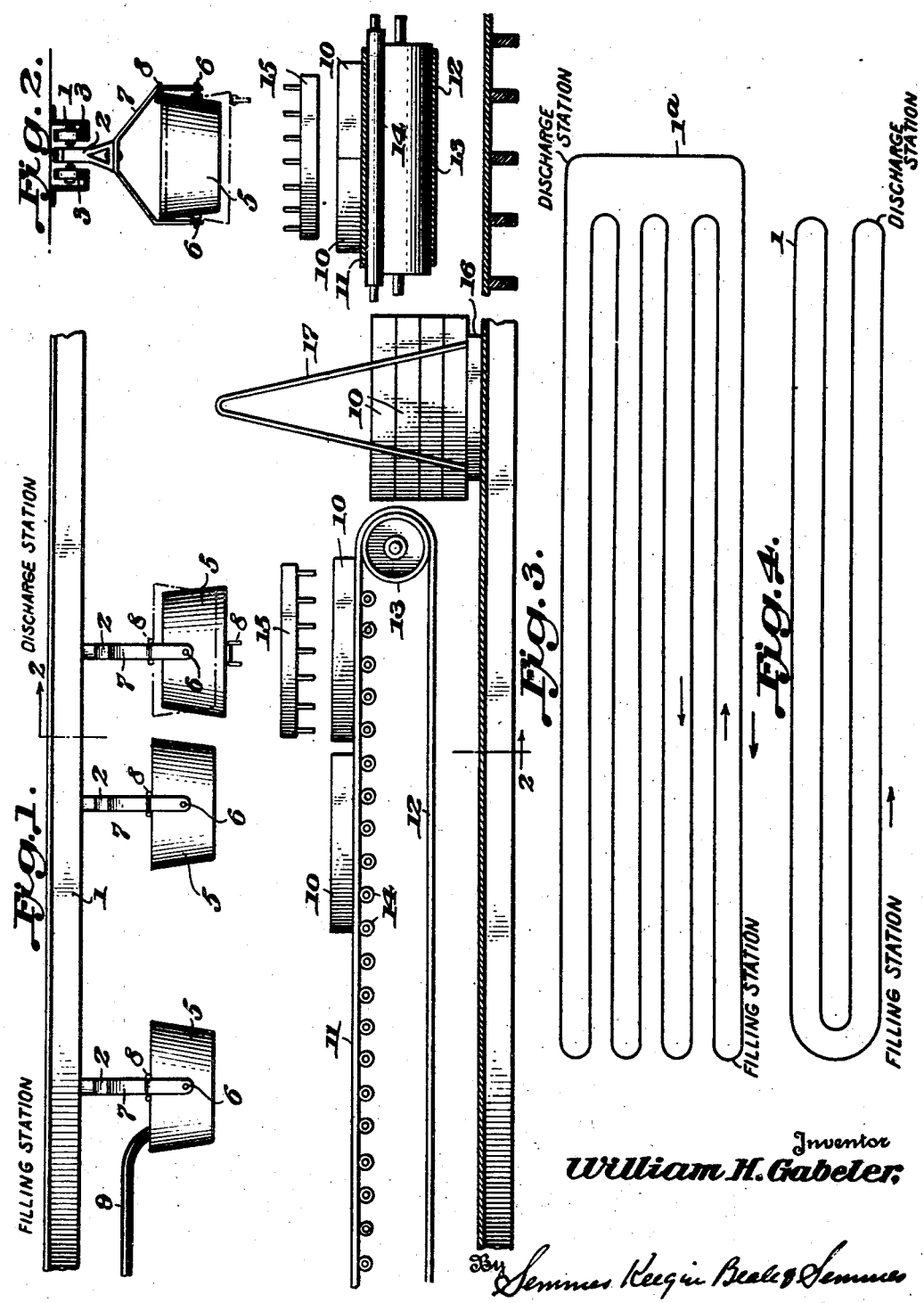
Inventor
William H. Gabeler Patented July 22, 1947

2,424,232

UNITED STATES PATENT OFFICE 2,424,232

GEL MANUFACTURING APPARATUS

William H. Gabeler, Baltimore, Md., assignor to The Davison Chemical Corporation, Baltimore, Md.

Application January 22, 1943, Serial No. 473,244

2 Claims. (Cl. 23—260)

This invention relates to the manufacture of gels and more particularly has reference to apparatus for use in effecting the setting or gelation of hydrosols into hydrogels.

In the manufacture of gels such as silica gel, a hydrosol is first formed for example by the reaction between an acid solution such as sulphuric acid and a silicate solution such as sodium silicate. After the hydrosol is formed, it is introduced into a container and allowed to remain for a time until a set or gelation of the hydrosol has been effected.

In many instances, a large mass of the hydrosol may be run into a large container and allowed to stand until gelation or setting takes place. Difficulties are sometimes encountered in removing the hydrogel from the large container, and at most, the process is of the so-called batch type.

An object of the present invention is to provide an apparatus for use in effecting the setting or gelation of a hydrosol.

Another object of the present invention is to provide an apparatus for carrying out a continuous method of effecting the setting or gelation of a hydrosol.

A further object of this invention is to provide a relatively small container for use in the setting or gelation of a hydrosol and which may be inverted to remove the contents therefrom.

Yet another object of this invention is to provide a plurality of comparatively small containers supported on an endless conveyor to be serially filled with a hydrosol, and means operable after setting or gelation of the hydrosol has been effected, to serially remove the contents from the containers.

A still further object of this invention is to provide an apparatus for effecting the setting of a hydrosol which comprises a plurality of individual containers, a track supporting said containers for movement in circuitous path of a length and at a rate such that a sufficient time will elapse between the filling of the containers and the discharge of the contents thereof to permit setting or gelation of the hydrosol.

It is also an object of this invention to provide an apparatus for the setting of a hydrosol into a hydrogel and the subsequent handling and treatment of the hydrogel to prepare it for washing.

With these and other objects in view, the present invention resides in the parts and combinations hereinafter disclosed and as illustrated in the accompanying drawings.

In the drawings:

Figure 1 is a somewhat diagrammatical elevational view of an apparatus for carrying out the present invention.

Figure 2 is a transverse sectional view of the apparatus shown in Figure 1.

Figure 3 is a diagrammatic plan view of a conveyor system for carrying out one form of the present invention.

Figure 4 is a view similar to that of Figure 3, illustrating a modified form of the conveyor system for carrying out the present invention.

In carrying out the present invention, an apparatus including an endless conveyor is employed. As illustrated in Figures 1 and 2 of the drawings, the endless conveyor may comprise a track member 1 on which is supported carriages 2 including wheels 3 which roll on the track member 1. Carriages 2 are spaced at suitable intervals along the track member and may be connected by links 4 to form an endless conveyor chain which may be driven by any suitable mechanism.

Each of the carriages 2 has suspended therefrom a tub 5. A pair of trunnions 6 extend from diametrically opposite sides of the tub 5 and serve as a means for attachment of the tub to a bail 7 which is attached to the lower end of the carriage 2 as illustrated in Figure 2 of the drawings.

The connection between the trunnion 6 of the tub 5 and the bail 7 permits the tub to be inverted by tipping the same about the axis of the aligned trunnions 6. In this relation, it should be noted that the axis of the trunnions 6 is located below the center of gravity of the tub 5 when said tub is in a contents-carrying position as shown in full lines in Figure 2. In order to maintain the tub in its contents-carrying position, a small latch 8 is provided which comprises a U-shaped member pivotally mounted intermediate its arms in a bearing which is secured to the upper rim of the tub 5. When the tub is in its upright or contents-carrying position, the latch 8 is shifted to embrace one side of the bail 7 as illustrated in Figure 2 of the drawings and thereby prevents tipping of the tub about the axis of its trunnions 6.

In utilizing the apparatus illustrated in Figures 1 and 2 of the drawings, the tubs are latched in contents-carrying position and a hydrosol is introduced therein through a flexible hose 9 at a region or station adjacent the conveyor track which is designated "filling station." In filling the tubs 5, the level of the hydrosol is brought to a point just a few inches below the upper rim of the tub. The hydrosol which is introduced into the tubs may be formed in any suitable manner and, for instance, may comprise the product resulting from the mixture of a solution of sodium silicate and a solution of sulfuric acid. In any event, the hydrosol is introduced into the tubs as heretofore described and after one tub is filled to the proper level, it is moved away from the filling station and the next tub in the series of tubs carried by the conveyor is filled.

In one form of the present invention, the conveyor carries a number of tubs sufficient to form a batch of hydrogel of a desired quantity. In this form of the invention, the conveyor may be laid out in plan view as schematically illustrated in Figure 4 of the drawings. When operating according to this form of the invention, all of the tubs carried by the conveyor are filled with the hydrosol and then the conveyor together with the tubs filled with the hydrosol is allowed to remain stationary for a period of time sufficient to enable the hydrosol to gel and form a hydrogel. It has been found that in the case of a silica hydrogen formed from a hydrosol resulting from a mixture of solutions of sodium silicate and sulfuric acid, the hydrosol should be allowed to set for a period of about 4 to 4½ hours to form the hydrogel.

After sufficient time has elapsed to enable the hydrosol to set to form a hydrogel of desired characteristics, the first filled tub 5 is moved to the discharge station for removal of the hydrogel from the tub 5. At or before reaching this station, the hydrogel may be subjected to a treatment to facilitate the removal thereof from the tub in which it has set. One treatment that has been found to be satisfactory is to insert a tube through which air under pressure is introduced down through the hydrogel to the bottom of the tub. By ejecting air from the end of the tube, the hydrogel is split and cracked and the removal thereof from the tub is greatly facilitated.

At the discharge station, a plurality of trays 10 are carried on a belt conveyor 11 in pairs as illustrated in Figure 2 of the drawings. The conveyor 11 upon which the trays 10 are carried may comprise an endless belt 12 which passes over a pulley 13 at one end and is supported by a plurality of rollers 14 throughout its upper stretch. In place of the belt conveyor 12, any other suitable means for supporting the trays 10 at the discharge station and for facilitating the supply of trays to said station and the removal therefrom may be employed. In effecting the discharge of the hydrogel from the tubs 5, the latch 8 is released and the tub is allowed to be inverted as indicated in full lines in the right portion of Figure 1 under the caption "discharge station." The contents of the tub upon inversion of the latter, and after treatment, if required to facilitate removal of the hydrogel from the tub, will fall into the trays 10 positioned beneath the tub 5 at the discharge station.

In order to break up the hydrogel falling from the inverted tub 5, a cutting screen 15 is interposed above the trays 10 in the gel receiving position at the discharge station. The cutting screen may be formed of a plurality of bars arranged as indicated in Figures 1 and 2 of the drawings. After the gel has been deposited onto the cutting screen 15, any large pieces which do not fall through the screen may be pushed through manually by an operator striking the mass of gel which does not pass through the screen and causing the mass to be broken into smaller pieces which will readily pass through the screen. The cutting screen serves to break up and somewhat distribute the hydrogel passing therethrough into the two washing trays 10 carried by the upper stretch of the conveyor 11. However, if required, an operator may level off and more evenly distribute the fragments of hydrogel in the trays 10. The tubs 5 and the trays 10 are of such relative sizes that the contents discharged from one tub will fill two trays.

After filling of the trays 10, they may be stacked on a suitable rack by means of which they may be carried to a washing tank. This rack as illustrated in Figure 1 of the drawings comprises a base member 16 from which looplike carrier members 17 extend upwardly. The carrier members may be formed of a corrosion resistant metal or other suitable material which will withstand the chemical action of the acid and any other corrosive substances which are washed from the hydrogel in the subsequent washing treatment. The wash trays 10 removed from the conveyor 12 are stacked upon the carrier rack 16 in pairs side by side as they are removed from the conveyor 12. When a sufficient number of trays is positioned on the rack, the latter is picked up by a crane and carried to the wash tank.

In carrying out the form of invention described, the setting of the hydrosol to form a hydrogel and the subsequent treatment is what may be termed a batch process in that there is quite a period of time during which many parts of the apparatus are out of operation. According to a modified form of the present invention, a continuous operation is effected. As illustrated in Figure 3 of the drawings the conveyor system or track 1a on which the plurality of tubs 5 are carried may be of such an extent and there may be a sufficiently large number of tubs employed so that by the time one tub has passed from the filling station to the discharge station, sufficient time will have elapsed to effect an adequate setting of the hydrosol into a hydrogel.

An operation involving this form of the present invention provides that the tubs 5 may be filled with the hydrosol as they pass the filling station. From this point, the tubs travel at such a rate of speed and through a sufficiently long path that before reaching the discharge station, the hydrosol in each tub will have been subjected to a setting action for the required period of time which, in the case of a silica hydrosol of the type hereinbefore mentioned, will be approximately 4 to 4½ hours. After the gel has reached the discharge station, it may be discharged in a manner identical to that illustrated in Figure 1 of the drawings and as hereinbefore described in detail.

There are many advantages to the effecting of the setting of the hydrogel in a continuously operating system in that substantially all of the mechanism is in continuous operation and the production output is consequently uniform and continuous.

From the foregoing description, it will be appreciated that the present invention provides an efficient and convenient apparatus for the setting of a sol into a hydrogel and for the handling of the sol during setting and after gelling to prepare the resulting hydrogel for a washing operation.

I claim:

1. Apparatus for the setting in course of travel of inorganic oxide hydrosol into a hydrogel, sizing the hydrogel, and distributing the same into washing trays, comprising an endless conveyor, a plurality of invertible receptacles advanced by said conveyor, a delivery station and discharge station in the path of said conveyor, means on said receptacles operable at said discharge station to invert said receptacles, a cutting screen located immediately below the discharge point on said conveyor at the discharge station, and a support arranged to carry a plurality of stackable receiving trays and to locate a tray immediately below said cutting screen.

2. The apparatus of claim 1 in which said tray supporting means is a conveyor arranged to discharge said trays at a stacking and tray receiving and stacking station.

WILLIAM H. GABELER.

REFERENCES CITED

The following references are of record in the file of this patent:

UNITED STATES PATENTS

| Number | Name | Date |
|---|---|---|
| 308,405 | Durfee et al. | Nov. 24, 1884 |
| 873,380 | Leidal et al. | Dec. 10, 1907 |
| 900,681 | Neller et al. | Oct. 6, 1908 |
| 1,297,724 | Patrick | Mar. 18, 1919 |
| 1,761,991 | Ober | June 3, 1930 |
| 2,213,530 | Montero | Sept. 3, 1940 |
| 2,323,583 | Wilson | July 6, 1943 |

OTHER REFERENCES

Newill, "Good Food and How to Cook It," page 265. Published by D. Appleton-Century Co., N. Y. (1939).